United States Patent
Jin et al.

(10) Patent No.: US 11,255,752 B2
(45) Date of Patent: Feb. 22, 2022

(54) MECHANICAL COMBUSTION ABNORMALITY DIAGNOSIS DETERMINATION METHOD AND COMBUSTION ABNORMALITY DIAGNOSIS SYSTEM USING ENGINE NOISE

(71) Applicants: HYUNDAI MOTOR COMPANY, Seoul (KR); KIA MOTORS CORPORATION, Seoul (KR); Kookmin University Industry Academy Cooperation Foundation, Seoul (KR)

(72) Inventors: Jae-Min Jin, Seoul (KR); In-Soo Jung, Goyang-si (KR); Sung-Hwan Shin, Seoul (KR)

(73) Assignees: HYUNDAI MOTOR COMPANY, Seoul (KR); KIA MOTORS CORPORATION, Seoul (KR); Kookmin University Industry Academy Cooperation Foundation, Seoul (KR)

(*) Notice: Subject to any disclaimer, the term of this patent is extended or adjusted under 35 U.S.C. 154(b) by 19 days.

(21) Appl. No.: 16/839,933

(22) Filed: Apr. 3, 2020

(65) Prior Publication Data
US 2021/0181062 A1    Jun. 17, 2021

(30) Foreign Application Priority Data
Dec. 11, 2019    (KR) .................. 10-2019-0164551

(51) Int. Cl.
*G01M 15/12*    (2006.01)
*H04R 1/08*    (2006.01)
(Continued)

(52) U.S. Cl.
CPC ............ *G01M 15/12* (2013.01); *F02D 41/22* (2013.01); *G01H 11/06* (2013.01); *H04R 1/08* (2013.01);
(Continued)

(58) Field of Classification Search
None
See application file for complete search history.

(56) References Cited

U.S. PATENT DOCUMENTS

| 2004/0050363 | A1 | 3/2004 | Yamaoka et al. |
| 2010/0161255 | A1* | 6/2010 | Mian ............... G01N 29/041 702/56 |

(Continued)

*Primary Examiner* — Arleen M Vazquez
*Assistant Examiner* — Terence E Stifter, Jr.
(74) *Attorney, Agent, or Firm* — Lempia Summerfield Katz LLC

(57) ABSTRACT

A mechanical diagnosis method for combustion abnormality using engine noise includes: calculating an Energy K and a Loudness standard deviation index ($N_{STD}$) with Kurtosis analysis by a diagnosis controller 30 from noise data measured together with a signal component by rotation excitation of an engine 10; calculating a plurality of order frequency peak order component values by a Modulation Frequency Transform; and distinguishing a cylinder where abnormal combustion occurs from a cylinder where normal combustion occurs by applying a predetermined threshold to these calculated values, thereby classifying, by Modulation Frequency analysis, problem samples of the rotation excitation and combustion excitation influence of the engine in which the abnormality state determination of the engine has been difficult only with energy distribution while overcoming the limitation of Kurtosis analysis.

17 Claims, 7 Drawing Sheets

(51) Int. Cl.
*G01H 11/06* (2006.01)
*F02D 41/22* (2006.01)
*F02D 41/28* (2006.01)

(52) U.S. Cl.
CPC .. *F02D 2041/288* (2013.01); *F02D 2200/025* (2013.01)

(56) References Cited

U.S. PATENT DOCUMENTS

| | | | |
|---|---|---|---|
| 2012/0323531 A1* | 12/2012 | Pascu | F01D 17/02 |
| | | | 702/184 |
| 2016/0370255 A1* | 12/2016 | Zahdeh | G01M 15/12 |
| 2017/0254726 A1* | 9/2017 | Das | F02D 41/0085 |
| 2017/0363030 A1* | 12/2017 | Melis | F02D 41/26 |
| 2019/0170704 A1* | 6/2019 | Araki | G01N 29/4472 |
| 2020/0003736 A1* | 1/2020 | Bittner | G01N 29/46 |

* cited by examiner

- Energy $K = Mean(Modified\ Kurtosis)$ $$= \frac{1}{N} \frac{\sum_{i=0}^{N} \left(\frac{1}{T}\int_{a_i}^{a_i+T} x^4\right)}{\sum_{i=0}^{N} \left(\frac{1}{T}\int_{a_i}^{a_i+T} x^2\right)^2}$$

CALCULATION PERIOD T = 100msec
REPETITION CALCULATION SECTION (OVERLAP) = 50%

$$Kurtosis = \frac{E[(X-\mu)^4]}{(E[(X-\mu)^2])^2}$$

MECHANICAL COMBUSTION ABNORMALITY DIAGNOSIS DETERMINATION METHOD AND COMBUSTION ABNORMALITY DIAGNOSIS SYSTEM USING ENGINE NOISE

CROSS-REFERENCE TO RELATED APPLICATION

This application claims priority to and the benefit of Korean Patent Application No. 10-2019-0164551, filed on Dec. 11, 2019, the entire contents of which are incorporated herein by reference.

FIELD

The present disclosure relates to an engine combustion abnormality diagnosis, and more particularly, to a combustion abnormality diagnosis system.

BACKGROUND

The statements in this section merely provide background information related to the present disclosure and may not constitute prior art.

In general, an engine combustion control in a vehicle is an example of an engine control technology which is important because it may satisfy the aspects of a stable combustion and combustion sound control with a combustion robustness control under disturbance conditions such as environment, usage fuel difference, and engine aging, and high compression ratio engines such as a diesel engine and a passenger diesel engine.

Therefore, the engine combustion control is important to determine whether the current failure occurs by a combustion signal for each cylinder (that is, the cylinder) of the engine, and to determine in which cylinder a main signal of the failure occurs.

For example, an engine combustion abnormality determination method may apply the Kurtosis analysis. In this case, Kurtosis has the feature which may determine and analyze whether a problem occurs with one signal analysis and have a simple computation procedure by using the characteristics which occurs largely if there are signals having a large difference in magnitude from the average value while many signals of concentrated magnitude occur.

To this end, the engine combustion abnormality determination method measures the micro-noise mounted to the engine, performs data processing based on the Kurtosis analysis, which represents the energy distribution by the noise analysis, and determines it as a combustion abnormality state when exceeding a predetermined threshold through the Kurtosis analysis.

However, we have discovered that if the Kurtosis analysis is used in the engine combustion abnormality diagnosis method, the analyzed result does not include the influence by rotational excitation even if an excitation force, which is proportional to the rotation, occurs when the mechanical abnormality of a rotating body occurs.

For example, a four-cylinder, four-stroke engine produces four combustion excitations in two revolutions, resulting in the largest noise component by a second (twice relative to one revolution) component, but the Kurtosis analysis is performed without including the contents of analyzing and determining based on the excitation by such rotation.

SUMMARY

The present disclosure provides a mechanical diagnosis method of combustion abnormality and combustion abnormality diagnosis system using engine noise, which apply modulation frequency analysis to the noise classification occurring in a high frequency region by the rotation excitation, thereby overcoming the limitation of the Kurtosis analysis in which the abnormality state of the engine is determined only with energy distribution, and in particular, classify a problem sample having the rotation excitation and combustion excitation influence of the engine which make it difficult to determine the accurate abnormality state of the engine only with the energy distribution of the Kurtosis analysis, thereby improving the robustness of the combustion abnormality problem determination.

A mechanical diagnosis method of combustion abnormality according to the present disclosure for achieving the object measures an abnormal noise of internal combustion engine by a microphone, analyzes the energy distribution for a frequency of the measured noise by Kurtosis, frequency-analyzes a high frequency by Modulation Frequency Transform, and determines that mechanical abnormality has occurred when exceeding a predetermined threshold.

More specifically, the mechanical diagnosis method of combustion abnormality includes an engine noise analysis control which calculates, by a diagnosis controller, a Kurtosis index from the noise data measured together with the signal component by the rotation excitation during an operation of the engine by Kurtosis analysis, calculates a Modulation Frequency Index from the noise data by a Modulation Frequency Transform, and determines a problem occurrence cylinder by a predetermined threshold applied to each of the Kurtosis index and the Modulation Frequency Index.

In one form, the Kurtosis index is an Energy K and a Loudness standard deviation index for the noise data, the Modulation Frequency Index is a plurality of order component values for the order frequency peak for the noise data, and the plurality of order component values are an $0.5^{th}$ order component value, a primary component value, and a secondary component value of the order frequency peak.

In another form, the engine noise analysis control is performed with a Kurtosis analysis control of determining the problem occurrence cylinder by applying the predetermined threshold to the Kurtosis index calculated from the magnitude standardization of a noise level for the noise data and a specific frequency band, a modulation frequency analysis control of calculating the Modulation Frequency Index from the Down sampling and Transform of a plurality of times for the noise data, and an excitation influence determination control of determining the problem occurrence cylinder by applying the predetermined threshold to the Modulation Frequency Index.

In some forms of the present disclosure, the Kurtosis analysis control is performed with performing magnitude standardization for the noise level of the noise data, selecting a specific frequency band by a Band Pass Filter processing, calculating an Energy K and a Loudness standard deviation index as the Kurtosis index by the Kurtosis analysis, and determining the problem occurrence cylinder by confirming combustion abnormality with the predetermined threshold applied to the Energy K and the Loudness standard deviation index.

In some forms of the present disclosure, the magnitude standardization is 90 dB, the specific frequency band is 0.5 to 4 kHz, the predetermined threshold of the Energy K is 3.8, and the Loudness standard deviation index is 0.13. The combustion abnormality is confirmed when the Energy K or the Loudness standard deviation index is greater than the predetermined threshold.

In some forms of the present disclosure, the modulation frequency analysis control is performed with performing a plurality of times of Down samplings in the noise data, performing a Hilbert transform followed by an Envelope transform between the plurality of times of Down samplings, performing a Low Pass Filter processing between the plurality of times of Down samplings, performing a FFT transform after the plurality of times of Down samplings, and analyzing a plurality of order component values for the order frequency peak.

In some forms of the present disclosure, the plurality of times of Down samplings are classified into a primary Down sampling which performs resampling for the interesting frequency region at a twice level with respect to the noise data, a secondary Down sampling which performs resampling at a ½ level of the primary Down sampling with respect to the Envelope-transformed data, and a tertiary Down sampling which performs resampling at a twice level relative to the reference frequency of the FFT with respect to the Low Pass Filter-processed data.

In some forms of the present disclosure, the excitation influence determination control is performed with classifying the plurality of order component values into an $0.5^{th}$ component value, a primary component value, and a secondary component value from the order frequency peak, determining the magnitude by applying the predetermined threshold to the $0.5^{th}$ component value, the primary component value, and the secondary component value as 0.075, and determining the problem occurrence cylinder or a normal cylinder by the result of the magnitude determination.

In some forms of the present disclosure, the magnitude determination is confirmed by applying the predetermined threshold to each of the $0.5^{th}$ component value, the primary component value, and the secondary component value, and the combustion abnormality is determined when each of the $0.5^{th}$ component value, the primary component value, and the secondary component value is greater than 0.075.

Further, a combustion abnormality diagnosis determination system according to the present disclosure for achieving the object includes a diagnosis controller for calculating an Energy K and a Loudness standard deviation index for the noise data measured together with a signal component by rotation excitation of an engine with Kurtosis analysis, calculating an $0.5^{th}$ component value, a primary component value, and a secondary component value of an order frequency peak by a Modulation Frequency Transform, and classifying a problem occurrence cylinder of combustion abnormality and a normal cylinder of combustion normality by a predetermined threshold applied to the Energy K, the Loudness standard deviation index, and the plurality of order component values and a noise measurement sensor for measuring the noise data during an operation of the engine.

In some forms of the present disclosure, the Energy K applies the predetermined threshold as 3.8, the Loudness standard deviation index applies the predetermined threshold as 0.13, and each of the $0.5^{th}$ component value of the order frequency peak, the primary component value of the order frequency peak, and the secondary component value of the order frequency peak identically applies the predetermined threshold as 0.075.

In some forms of the present disclosure, the noise measurement sensor uses a microphone mounted to an oil fan site of the engine to measure the noise data.

The mechanical abnormality diagnosis determination using the engine noise applied to the combustion abnormality diagnosis system according to the present disclosure implements the following operations and effects.

In some forms of the present disclosure, firstly, it is possible to combine the Modulation analysis and the Kurtosis analysis, thereby overcoming the limitation of the Kurtosis analysis in which the abnormality state of the engine is determined only with the energy distribution. Secondly, it is possible to classify the problem sample which makes it difficult to determine the abnormality state of the engine only with the energy distribution when determining the combustion abnormality of the engine. Thirdly, it is possible to perform the procedure of determining the measured noise with the levels of a value representing the energy distribution of the noise and the change in the noise magnitude and the excitation force by the engine rotation, thereby classifying the problem sample in which the influences of the rotation excitation and the combustion excitation are included together with the energy distribution in determining the problem. Fourthly, it is possible to include all the noise influences by the occurrence of the noise problem of a specific cylinder such as once per two revolutions, the rotating body problem such as once per one revolution, and the combustion excitation problem such as twice per one revolution, thereby improving the robustness for the combustion abnormality problem determination together with strengthening the excitation influence determination logic. Fifthly, it is possible to use the diagnostic microphone mounted in the engine oil gauge hole of the engine for the noise measurement for determining whether the mechanical abnormality occurs, thereby improving the combustion abnormality diagnosis system without changing the engine system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
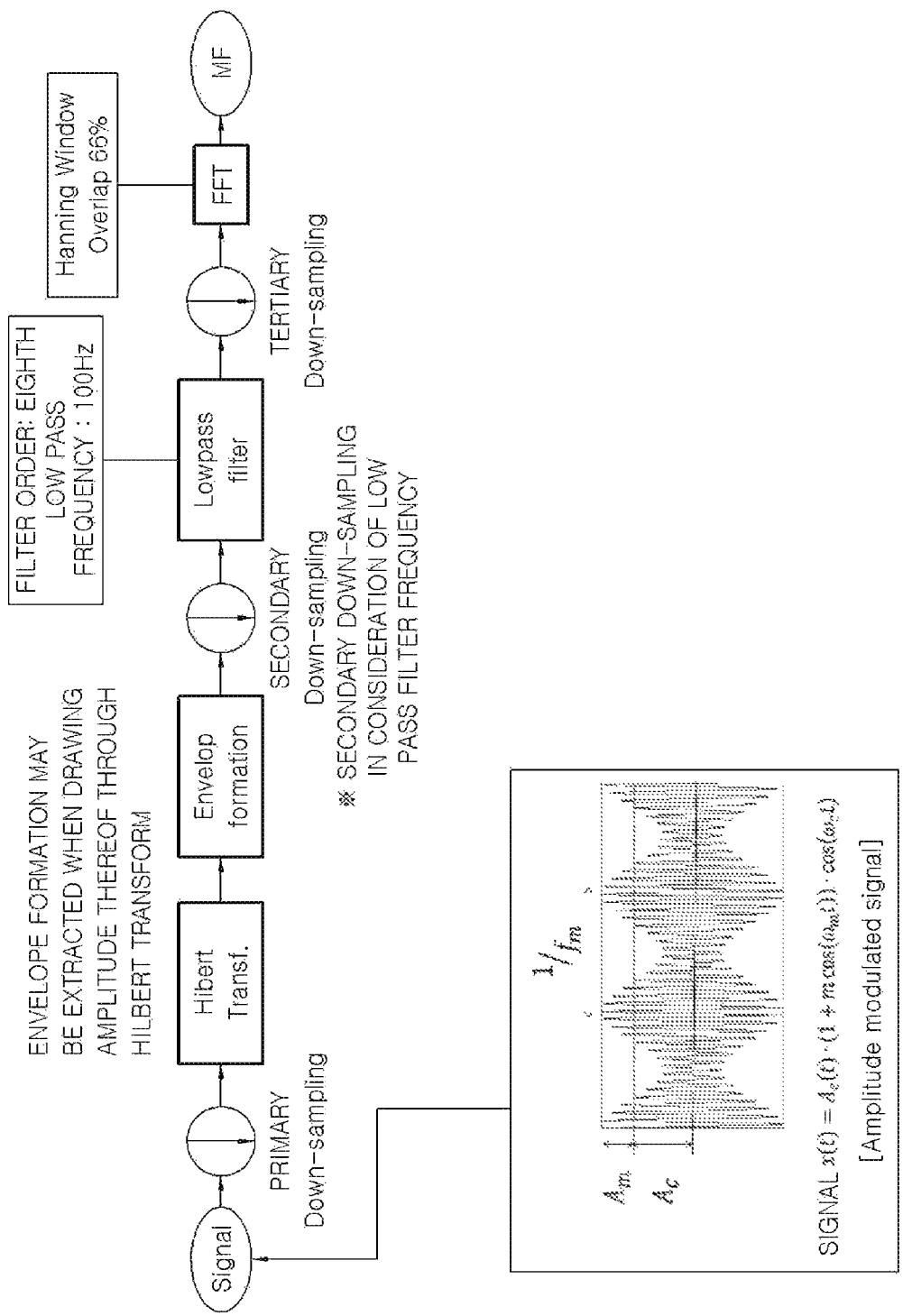
Figure 6:
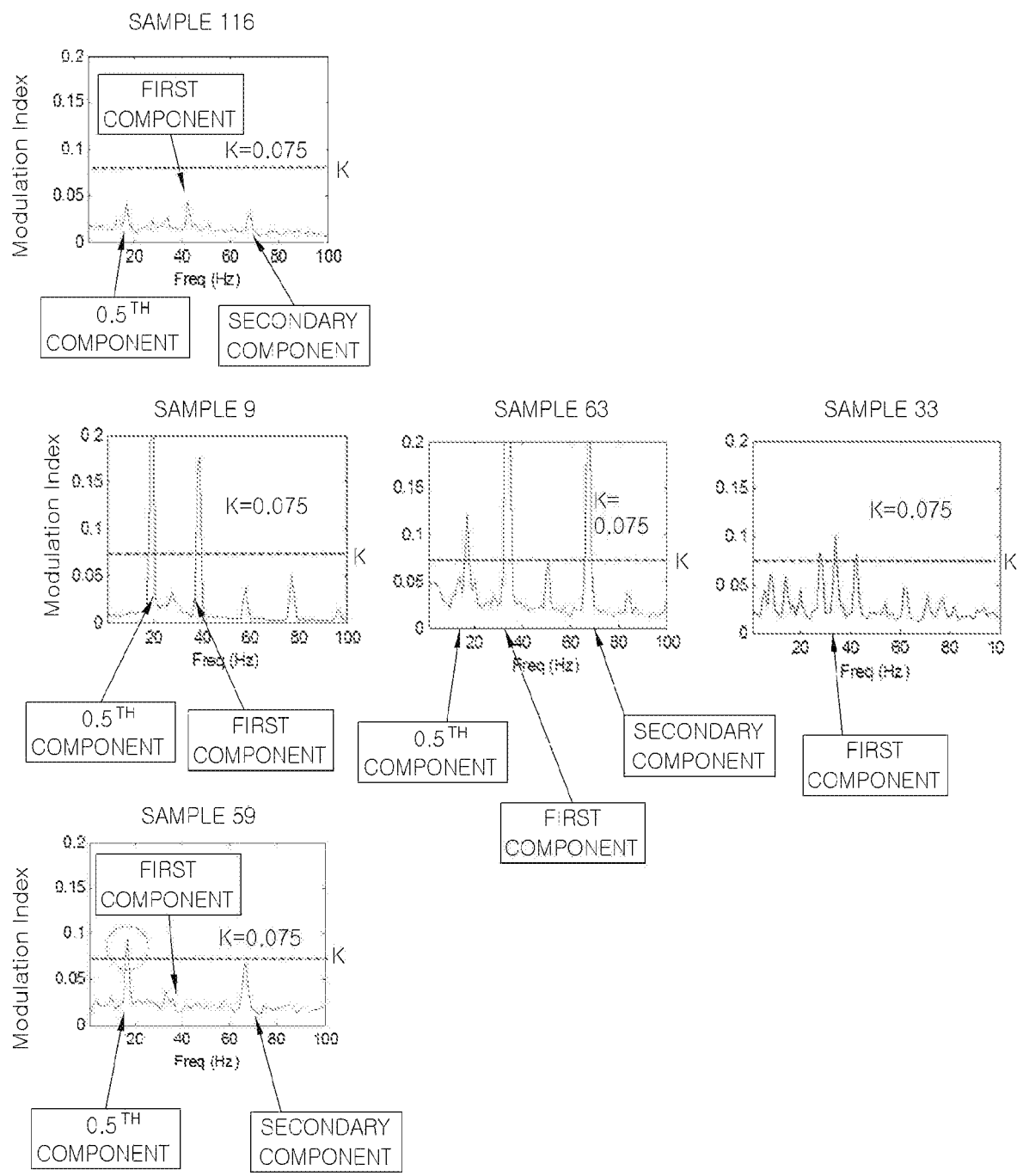

FIG. 5 is a diagram showing an example of calculating the magnitude by a Modulation Frequency through a modulation frequency analysis control according to one form of the present disclosure; and FIG. 6 is a diagram showing examples in which the problem occurrence determination of combustion abnormality having considered the excitation influence in the Energy K smaller than the Kurtosis determination reference is performed by the order difference component which is the modulation frequency analysis result according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings, and since such forms may be implemented in various different forms by those skilled in the art to which the present disclosure pertains as an example, they are not limited to the forms described herein.

Figure 1A:
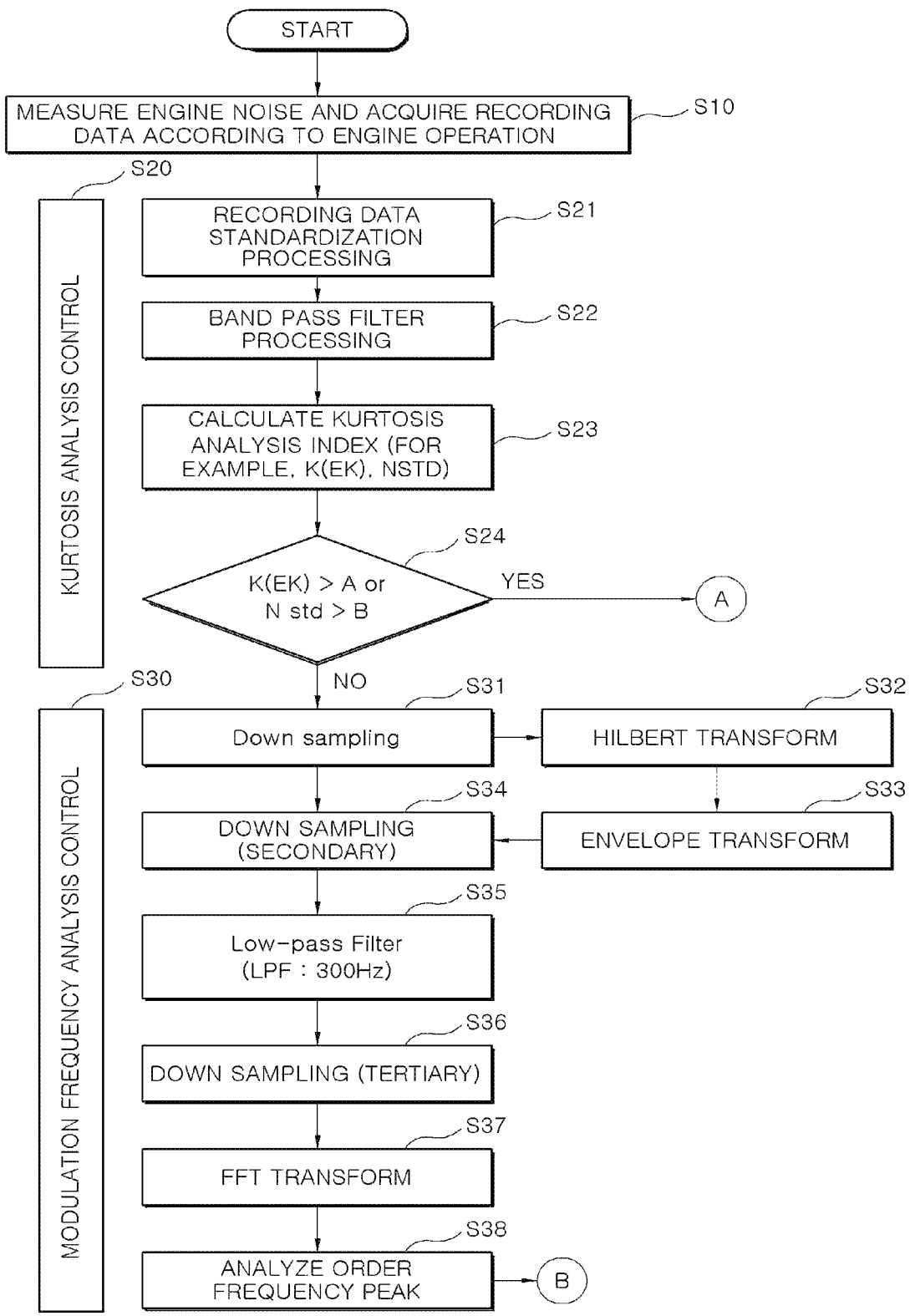
FIGS. 1A and 1B are flowcharts of a mechanical diagnosis method of combustion abnormality using engine noise according to one form of the present disclosure.
Figure 1B:
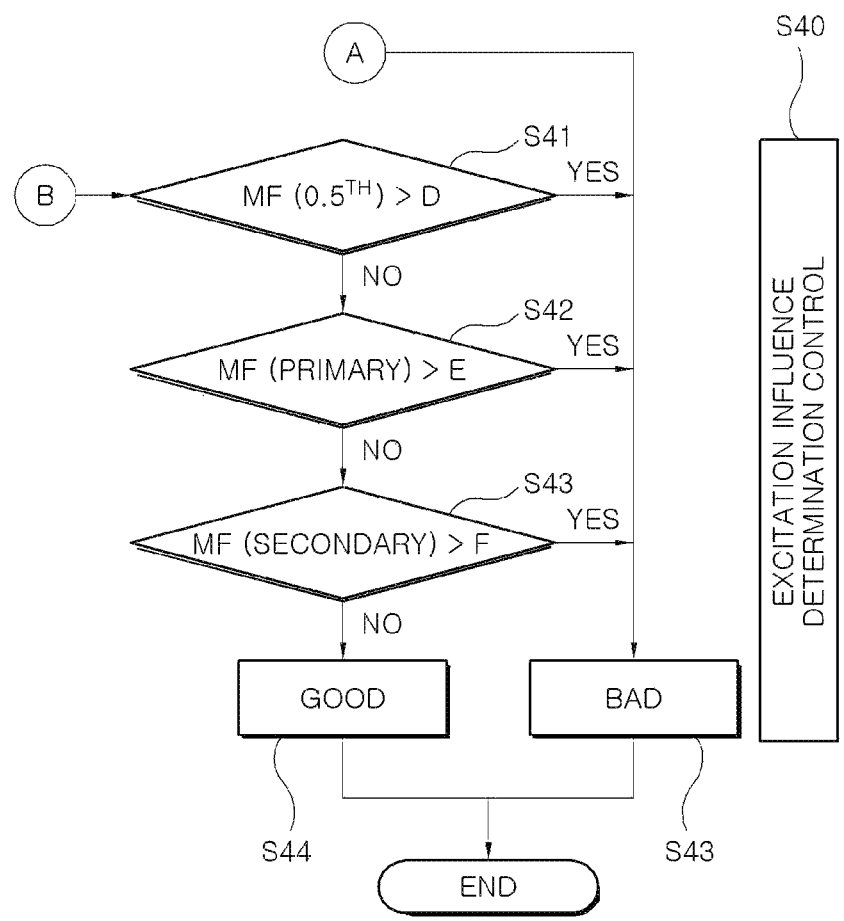

Referring to FIGS. 1A and 1B, a mechanical diagnosis method of combustion abnormality performs mechanical abnormality diagnosis in an engine noise analysis control (S20 to S40) for the noise data measured and recorded at engine operation (S10), thereby accurately distinguishing a combustion abnormality cylinder among engine cylinders from the problem occurrence of the combustion abnormality.

In particular, the engine noise analysis control (S20 to S40) standardizes a noise level to a predetermined magnitude (for example, 90 dB) with respect to the noise data in a Kurtosis analysis control (S20), and performs order frequency peak analysis through Down sampling and Transform a plurality of times in a modulation frequency analysis control (S30), and secures discriminant accuracy of a problem occurrence cylinder (for example, combustion abnormality) and a normal cylinder (for example, combustion normality) by comparing a threshold for the modulation frequency from the result of the order frequency peak analysis in an excitation influence determination control (S40).

As a result, the mechanical diagnosis method of combustion abnormality is characterized by a mechanical combustion abnormality diagnosis determination method using engine noise, and the mechanical diagnosis method of combustion abnormality using the engine vibration signal may implement the following advantages.

Firstly, it is possible to include the combustion excitation affecting the noise due to the combustion abnormality problem occurrence, thereby strengthening problem occurrence determination logic for the excitation occurring at rotation. Secondly, it is possible to determine whether there is a current failure and in which cylinder the main signal of the failure occurs based on the noise data recorded, including the excitation influence at engine operation. Thirdly, it is possible to determine the combustion abnormality having considered the excitation influence in a case smaller than the determination reference value (for example, 3.8) of the Energy K of the Kurtosis analysis having not considered the excitation influence by determining the problem occurrence cylinder (for example, combustion abnormality) at a specific value (for example, 0.075) or more of the order component (for example, 0.5$^{th}$ component, primary component, secondary component) of the order frequency peak value with the modulation frequency analysis.

Figure 2:
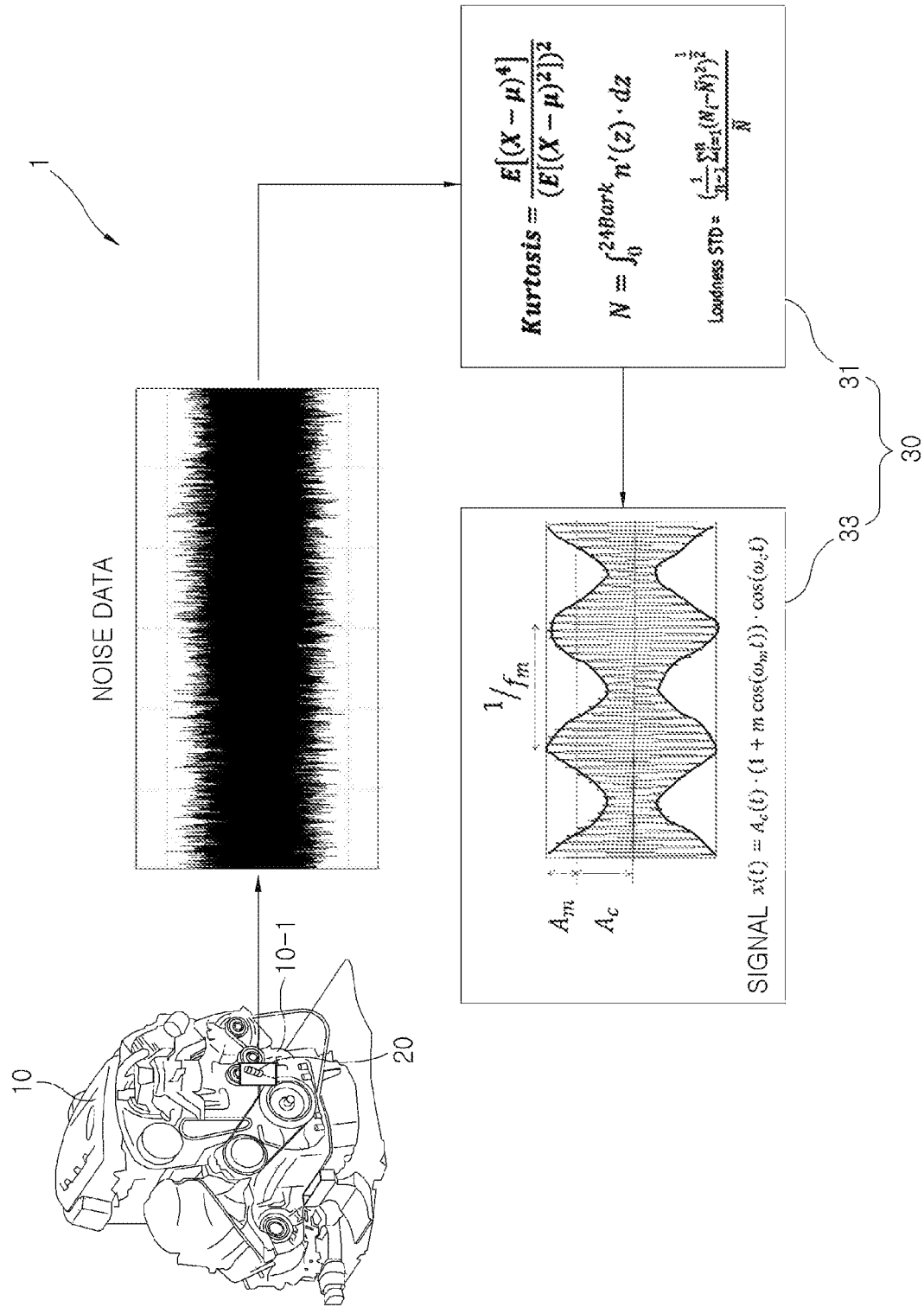
FIG. 2 is a diagram showing an example of a combustion abnormality diagnosis system in which the mechanical diagnosis method of combustion abnormality using engine noise according to one form of the present disclosure is implemented.

Referring to FIG. 2, a combustion failure diagnosis system 1 includes an engine 10, a noise measurement sensor 20, and a diagnosis controller 30.

Specifically, the engine 10 is a typical gasoline or diesel engine, and the noise measurement sensor 20 is mounted to a predetermined site of an oil pan 10-1 provided in the engine 10 by a microphone. In this case, the oil pan site may be a site where an engine oil level gauge is mounted but may be a site where the noise measurement according to an engine operation and the excitation influence due to the engine rotation may be easily detected.

Specifically, the diagnosis controller 30 performs logic processing such as excitation influence noise signal standardized based Kurtosis analysis, order frequency peak based modulation frequency analysis, or modulation frequency threshold comparison based excitation influence determination by using the noise data of the noise measurement sensor 20 as an input signal. In particular, a program or an algorithm for the Kurtosis analysis control (S20), the modulation frequency analysis control (S30), and the excitation influence determination control (S40) is stored in the memory, and the diagnosis controller 30 is operated as a Central Processing Unit which implements logic processing of the program or the algorithm.

To this end, the diagnosis controller 30 includes a Kurtosis analysis module 31 and a modulation frequency analysis module 33. The Kurtosis analysis module 31 confirms the energy distribution of the noise data by the level standardization (for example, 90 dB) of the noise data, specific noise band selection (for example, 0.5 to 4 kHz noise band), and an Energy K (average value) through Kurtosis noise analysis. The modulation frequency analysis module 33 performs the modulation frequency analysis and the excitation influence determination by three Down sampling and Hilbert/Envelope/Fast Fourier Transform (FFT) transform for 90 dB of the noise data and 0.5 to 4 kHz band.

Hereinafter, the mechanical combustion abnormality diagnosis determination method using the engine noise will be described in detail with reference to FIGS. 2 to 6. In this case, the control subject is the diagnosis controller 30, and the control subject is the engine 10 and an injector fuel injection pattern.

First, the diagnosis controller 30 acquires engine noise measurement and recording data according to an engine operation of S10.

Referring to FIG. 2, the diagnosis controller 30 measures the noise generated by the engine 10 (i.e., an abnormal noise of internal combustion engine) in operation state with the noise measurement sensor 20 mounted to the engine 10 to detect and record it as the noise data, and store it in the memory. In this case, the noise data may be used with experimental data measured and recorded while operating the engine 10 at a specific engine RPM by using a microphone installed at an engine oil level gauge position as the noise measurement sensor 20.

Subsequently, the diagnosis controller 30 performs the Kurtosis analysis control (S20) with standardizing the recorded noise data (S21), processing a band pass filter (BPF) (S22), calculating a Kurtosis analysis index (S23), and determining combustion abnormality (S24).

For example, the standardizing of the noise data (S21) standardizes the noise level to the magnitude of 90 dB in the measured and recorded noise data, and the processing of the BPF (S22) selects a frequency of 0.5 to 4 kHz band in 90 dB standardized noise. Therefore, the Kurtosis analysis control (S20) narrows the frequency into the 0.5 to 4 kHz band while standardizing the noise level to the magnitude of 90 dB with respect to the noise data.

For example, the calculating the Kurtosis index (S23) is classified into an energy K calculated from a Modified Kurtosis equation and an $N_{STD}$ calculated from a Loudness Standard Deviation equation. In this case, the Energy K is the average Kurtosis value in the 90 dB/0.5~4 kHz band, and the $N_{STD}$ is the Loudness standard deviation exponent represented by the Energy K value.

Figure 3:
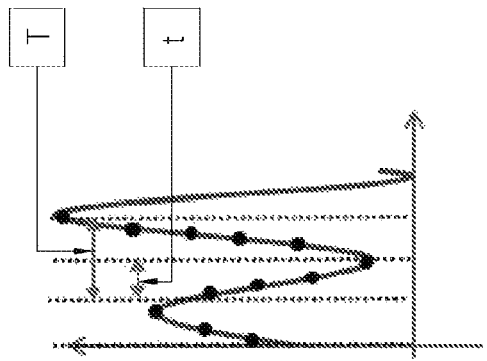
FIG. 3 is a diagram showing a Kurtosis analysis state for a frequency of a noise signal according to one form of the present disclosure.
Figure 3:
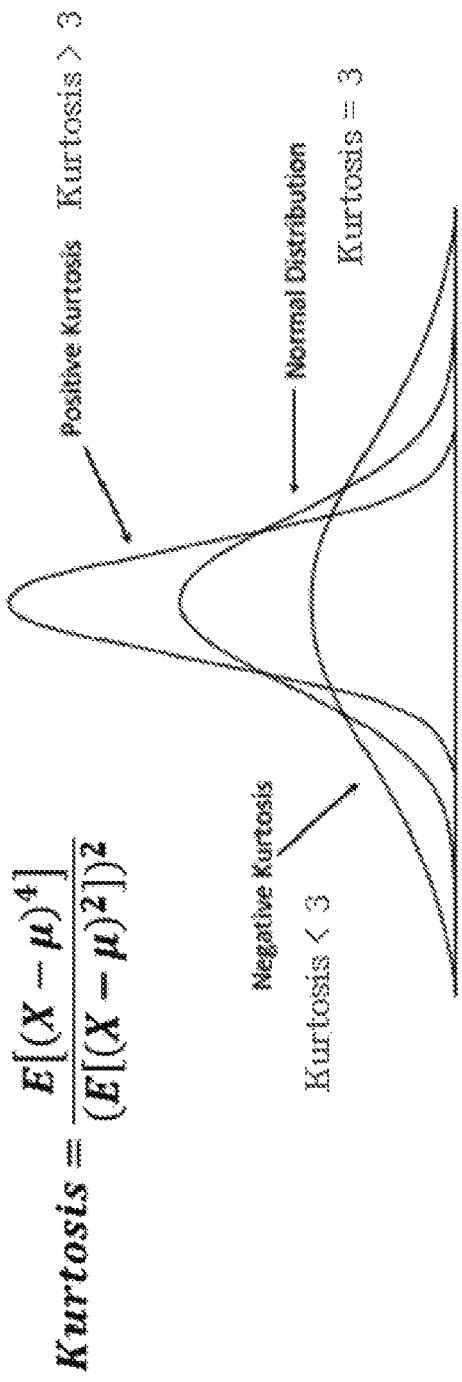

Referring to FIG. 3, the diagnosis controller 30 calculates the Energy K and the $N_{STD}$ by applying a Kurtosis calculation formula in the Kurtosis analysis module 31. This is because Kurtosis is a feature vector, such that it is sensitive to a wideband noise component as well as periodic large signal detection on time donation, and has the characteristics which occurs largely when signals having a large difference from the average value (μ) are present while a large number of signals of the concentrated magnitude occur.

Kurtosis calculation formula:

$$\text{Modified Kurtosis}[x] = \frac{\frac{1}{n}\sum_{i=1}^{n} x_i^4}{\left(\frac{1}{n}\sum_{i=1}^{n} x_i^2\right)^2}$$

$$\text{Energy } K = \text{Mean}(\text{Modified Kurtosis})$$

$$= \frac{1_+}{N_+} \frac{\sum_{i=0}^{N}\left(\frac{1}{T}\int_{a_i}^{a_i+T} x^4\right)}{\left(\sum_{i=0}^{N}\left(\frac{1}{T}\int_{a_i}^{a_i+T} x^2\right)\right)^2}$$

$$\text{Kurtosis} = \frac{E[(X-\mu)^4]}{(E[(X-\mu)^2])^2}$$

Here, the average/function expression represents the general formula of Kurtosis, the "T" refers to the calculation period, the "μ" refers to the normal distribution mean value, and the "E" refers to the Energy K.

In this case, a value of the Energy K is calculated from the Kurtosis energy average equation by applying a repetition calculation section (Overlap) (t) of 50% while setting the calculation period (T) to about 100 msec. From the Kurtosis normal distribution function expression, based on Kurtosis=3 as Normal Distribution, Kurtosis<3 which is smaller than the above is referred to as Negative Kurtosis, whereas Kurtosis>3 which is greater than the above is referred to as Positive Kurtosis.

Therefore, the Kurtosis is determined as the abnormality occurrence (that is, combustion abnormality) in the case where the magnitude difference between signals is large because the Kurtosis is smaller than 3 or the Kurtosis is greater than 3 in the normal distribution function representing that the Kurtosis is 3.

Figure 4:
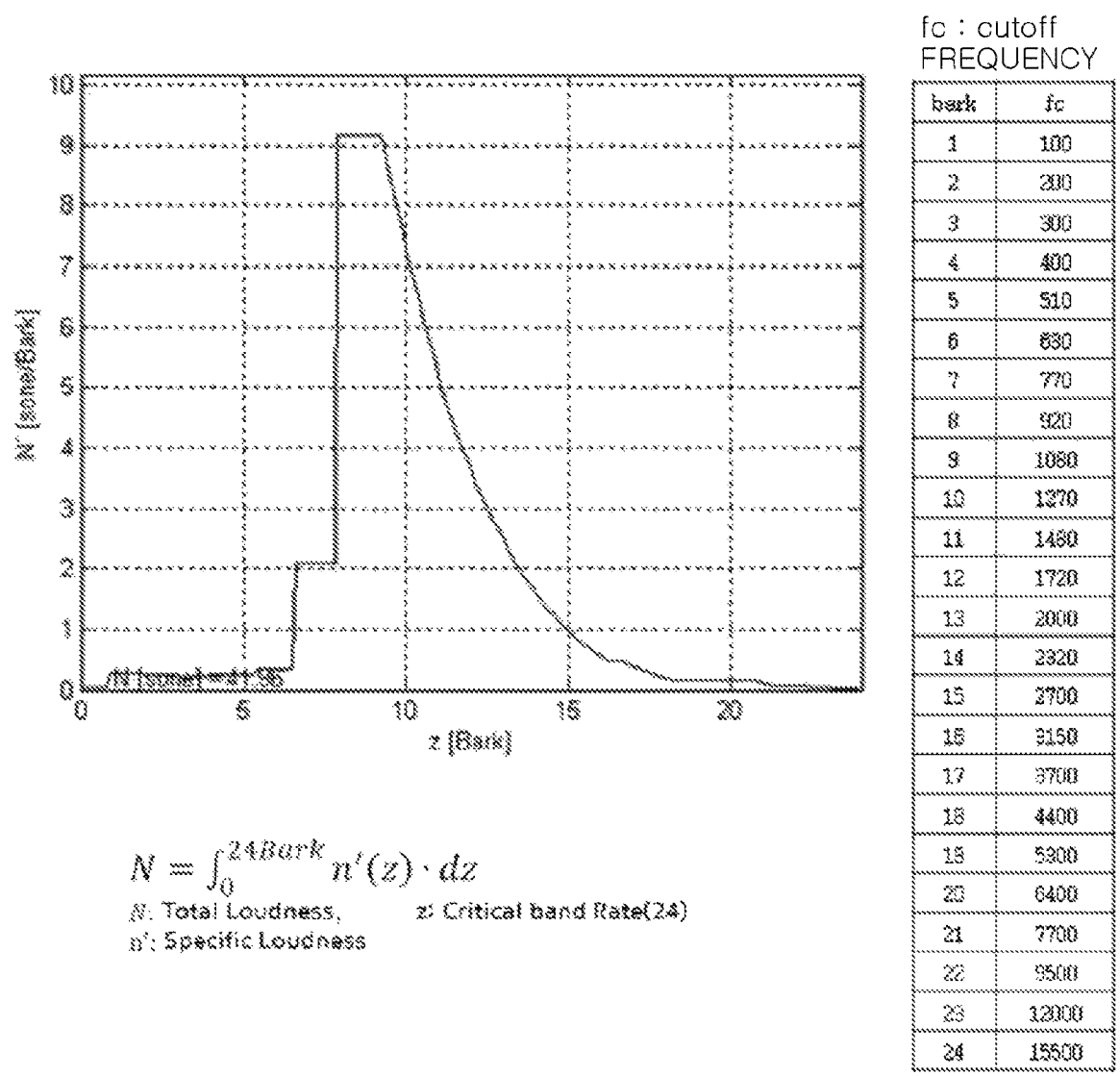
FIG. 4 is a diagram showing a Kurtosis analysis normal distribution function and a $N_{STD}$ state of a Loudness standard deviation through a Kurtosis analysis control according to one form of the present disclosure.

Referring to FIG. 4, the diagnosis controller 30 applies a Loudness Standard Deviation equation in the Kurtosis analysis module 31. This is because, when the change in sound is large, the Loudness STD ($N_{STD}$) increases, thereby determining the abnormality occurrence (that is, combustion abnormality).

Loudness Standard Deviation:

$$N = \int_{0}^{24Bark} n'(z) \cdot dz$$

$$\text{Loudness } STD = \frac{\left(\frac{1}{n-1}\sum_{i=1}^{n}(N_i - \overline{N})^2\right)^{\frac{1}{2}}}{\overline{N}}$$

Here, the "N" refers to Total Loudness, the "Z" refers to the Critical Band Rate, and the "N'" refers to the Specific Loudness.

From the above, in the step of the calculation of the Loudness is as follows: 1) The Loudness calculation time sets 5 seconds. 2) The loudness calculation period time sets 300 msec for 10 revolutions because one revolution time at 2000 Revolution Per Minute (RPM) is 30 msec (1/(2000/60)). 3) The Loudness calculation Overlap sets 50% (150 msec) and calculates repeatedly during a duration of 5 revolutions in the case of 150 msec. 4) A DIN, ISO523-1 method as the Loudness calculation method divides the 300 msec into a total of 24 bark during the loudness calculation period time.

For example, the determining the combustion abnormality (S24) compares and determines with the following abnormality noise discriminant expression by using the calculated Energy K(EK) or $N_{STD}$ as a Kurtosis index.

$K(EK)>A$ or $N_{STD}>B$   Abnormality noise discriminant expression:

where the "A" is set to about 3.8 as the Energy K Threshold, and the "B" is set to about 0.13 as the Loudness Standard Deviation Threshold.

As a result, the diagnosis controller 30 switches to the excitation influence determination control (S40) if the K(EK) is greater than the Energy K Threshold (A) or the $N_{STD}$ is greater than the Loudness Standard Deviation Threshold (B) and determines it as a problem occurrence cylinder (for example, combustion abnormality) (S45), and displays the combustion abnormality cylinder information by text and stores it in the memory while ending the procedure of the mechanical combustion abnormality diagnosis determination using the engine noise.

Meanwhile, the diagnosis controller 30 enters the modulation frequency analysis control (S30) in order to implement more accurate determination in consideration of the excitation influence than the case where the K(EK) is smaller than the Energy K Threshold (A) or the $N_{STD}$ is smaller than the Loudness Standard Deviation Threshold (B).

Continuously, the diagnosis controller 30 performs the modulation frequency analysis control (S30) with performing the Down sampling (S31), performing a Hilbert transform (S32), performing an Envelope transform (S33), repeatedly performing the Down sampling (S34), processing a Low Pass Filter (S35), re-performing the Down sampling (S36), performing a Fast Fourier Transform (FFT) transform (S37), and analyzing an Order Frequency Peak (S38). Here, the Down sampling is a processing of lowering a Sampling rate which is the amount of data collected for 1 second for a noise signal.

From the above, the diagnosis controller 30 may perform the combustion abnormality determination having considered the excitation influence by determining it as the problem occurrence cylinder (for example, combustion abnormality) even if any one order of the order components (for example, $0.5^{th}$ component, a primary component, a secondary component) of the order frequency peak value is smaller than the determination threshold (for example, 3.8) of the Energy K confirmed as the normal combustion in the Kurtosis analysis control (S20) when exceeding a specific value (for example, 0.075).

Referring to FIG. 5, the diagnosis controller 30 calculates the magnitude of the frequency of the noise data measured by the engine 10 during operation in the modulation frequency analysis module 33.

To this end, an Amplitude Modulation Signal is calculated as a modulation frequency magnitude by using a modulation frequency and a Modulation Index.

Signal: $x(t) = A_c(t) \times (1 + m \cos(\omega_m t) \times \cos(\omega_m t))$

Modulation frequency formula: $f_m(HZ) = \omega_m / 2\pi$

Modulation Index Expression: $m = A_m / A_c$ where the "t" refers to the time (second), the "$A_m$" refers to the amplitude of high frequency excitation, the "$A_c$" refers to the amplitude of low frequency excitation, the "m" refers to the modulation index representing a ratio of the low frequency excitation amplitude to the high frequency excitation amplitude, the "$\omega_m$" refers to the angular frequency of the modulation wave, and the "$f_m(HZ)$" refers to the modulation frequency representing the low frequency component which delivers the high frequency component.

For example, the performing of Down sampling (S31) is a primary Down sampling process of lowering a sampling rate, which is the amount of data collected of an interesting frequency region of a noise signal, and reduces the data amount by resampling the interesting frequency region, in which sampling is performed, at a twice level (for example, a level of 10 kHz if the interesting frequency region is 5 kHz). The repeatedly performing of the Down sampling (S34) is a secondary Down sampling process of lowering the sampling rate for the Hilbert/Envelope-transformed signal, and reduces the calculation amount by resampling it with a ½ level of the primary Down sampling processing. In particular, it is performed in consideration of a low pass filter frequency (for example, 100 Jz). The re-performing of the Down sampling (S36) is a tertiary Down sampling processing of lowering the sampling rate for the Low Pass Filter-processed signal, and reduces the calculation amount by resampling the frequency region at a twice level (for example, a level of about 667 Hz if the FFT reference is a level of 333 Hz) relative to the FFT reference.

For example, the performing of the Hilbert transform (S32) transforms $\cos(\omega_m t)$ into $\sin(\omega_m t)$ with a 90 degree phase change, and extracts Envelope Formation by drawing the transformed amplitude. In this case, the performing of the Hilbert transform (S32) uses the following Hilbert transform equation in order to transform a Hilbert transform time signal into polar coordinates.

Hilbert transform equation: $s_a(t) = s_m(t) e^{j\phi(t)}$

For example, the performing of the Envelope transform (S33) extracts a line drawn as if the edges of the waveform are connected to each other to surround the waveform. That is, the performing of the Envelope transform (S33) represents the magnitude of the Hilbert transform value in phase.

Hilbert transform value: $s_m(t) \triangleq |s_a(t)|$ phase: $\phi(t) \triangleq \arg[s_a(t)]$ For example, the performing of the low pass filter processing (S35) passes a low frequency component while blocking a high frequency component of the signal. In this case, the performing of the low pass filter processing (S35) sets a level of the 333 Hz to an interesting region as the $10^{th}$ order when the 33.3 Hz is the primary order of 2000 RPM to apply a Low pass frequency (LPF) at a level of about 400 Hz, by resampling based on the order value.

For example, the performing of the FFT transform (S37) is used for fast calculation of discrete time signal frequency domain analysis, composite product calculation in frequency domain, correlation function calculation, numerical analysis, and the like. In this case, since the performing of the FFT transform (S37) is a level of 333 Hz based on the FFT, the resampling is performed at a level of 667 Hz or more. In particular, the FFT transform applies data overlap for preventing the missing portion of the window effect by applying Hanning Window Overlap 66% in the Hanning Window which converts a non-periodic signal into a periodic signal by the window.

For example, the analyzing of the order frequency peak (S38) divides an order frequency peak value for each of a total of 10 orders into a $0.5^{th}$ order component value, a primary component value, and a secondary component value.

Finally, the diagnosis controller 30 performs the excitation influence determination control (S40) with determining once order frequency peak (S41), determining twice order frequency peak (S42), determining three times order frequency peak (S43), determining a normal cylinder (for example, combustion normality) as good (S44), and determining a problem occurrence cylinder (for example, combustion abnormality) as bad (S45). In this case, the $0.5^{th}$ order component value, the primary component value, and the secondary component value of the order frequency peak are applied to a combustion abnormality determination expression by being applied as Modulation Frequency Indexes.

For example, the determining of the once order frequency peak (S41) is applied to the $0.5^{th}$ order component value of the order frequency peak, and determines whether the value is greater than the order frequency peak threshold through comparison. The determining of the twice order frequency peak (S42) is applied to the primary component value of the order frequency peak, and determines whether the value is greater than the order frequency peak threshold through comparison. The determining of the three times order frequency peak (S43) is applied to the secondary component value of the order frequency peak, and determines whether the value is greater than the order frequency peak threshold through comparison.

The combustion abnormality determination expression for this purpose is applied as follows, by using the $0.5^{th}$ order component value, the primary order component value, and the secondary order component value of the order frequency peak as Modulation Frequency Indexes.

Combustion abnormality determination expression:

$MF(0.5^{th}$ order component value$) > D$ $MF$(primary component value)$> E$ $MF$(secondary component value)$> F$ where each of "D, E, F" is set to about 0.075 as the order frequency peak threshold.

As a result, in the case where the MF ($0.5^{th}$ order component value)$>$D, the MF (primary order component value)$>$E, and the MF (secondary component value)$>$F are all established in the order frequency peak determination expression, it is determined as good (S44), whereas in the case where the MF ($0.5^{th}$ order component value)>D or the MF (primary component value)>E or the MF (secondary component value)>F is not established, it is determined as bad (S45).

Meanwhile, FIG. 6 exemplifies a state where the combustion abnormality determination having considered the excitation influence is performed by determining it as the problem occurrence cylinder (for example, combustion abnormality) because the Energy K value of the Kurtosis determination criterion from the order frequency peak value of the modulation frequency analysis value (K) is smaller than 3.8 but any one among the $0.5^{th}$ order component value, the primary component value, and the secondary component value exceeds 0.075.

Referring to the Sample 116 in FIG. 6, the Sample 116 is a case where it was accurately determined as a normal cylinder (for example, combustion normality) even under the excitation influence because the Energy K value is a level smaller than 3.8 which is the determination threshold but any one among the $0.5^{th}$ order component value, the primary component value, and the secondary component value of the order frequency peak does not exceed 0.075 from the modulation frequency analysis value (K) of the modulation frequency based analysis result.

Referring to the Samples 9, 33, 63 in FIG. 6, the Samples 9, 33, 63 are cases where all the Energy K values are a level smaller than 3.8 which is the determination threshold but the Sample 9 is a case where the $0.5^{th}$ order component value and the primary component value of the order frequency peak exceed 0.075 from the modulation frequency analysis value (K) of the modulation frequency based analysis result, the Sample 33 is a case where the $0.5^{th}$ order component value of the order frequency peak exceeds 0.075 from the modulation frequency based analysis result, and the Sample 63 is a case where all the $0.5^{th}$ order component value, the primary component value, and the secondary component value of the order frequency peak exceed 0.075 from the modulation frequency analysis value (K) of the modulation frequency based analysis result, thereby being accurately determined as the problem occurrence cylinder (for example, combustion abnormality).

Referring to the Sample 59 in FIG. 6, the Sample 59 is a case where the Energy K value is a level smaller than 3.8 which is a determination threshold but the $0.5^{th}$ order component value among the $0.5^{th}$ order component value, the primary component value, and the secondary component value of the order frequency peak exceeds from the modulation frequency analysis value (K) of the modulation frequency based analysis result, thereby being accurately determined as the problem occurrence cylinder (for example, combustion abnormality).

As described above, the mechanical diagnosis method of combustion abnormality using the engine noise applied to the combustion abnormality diagnosis system 1 according to the present form may, by the diagnosis controller 30, calculate the Energy K and Loudness standard deviation index ($N_{STD}$) as the Kurtosis index by performing the Kurtosis analysis for the noise data measured together with the signal component by the rotation excitation of the engine 10, calculate the plurality of order component values for the order frequency peak as the Modulation Frequency Index by performing the Modulation Frequency Transform for the noise data, and classify it into the problem occurrence cylinder of the combustion abnormality and the normal cylinder of the combustion normality by applying the threshold to the Kurtosis index and the Modulation Frequency Index, thereby being able to classify, by the Modulation Frequency analysis, the problem samples of the rotation excitation and the combustion excitation influence of the engine in which the abnormality state determination of the engine has been difficult only with the energy distribution while overcoming the limitation of the Kurtosis analysis.

What is claimed is:

1. A mechanical diagnosis method for combustion abnormality, the mechanical diagnosis method comprising:
    measuring, by a microphone, an abnormal noise of an internal combustion engine;
    analyzing, by Kurtosis, energy distribution for a frequency of the measured abnormal noise;
    performing frequency analysis, by Modulation Frequency Transform, on a high frequency from the measured abnormal noise; and
    determining, by a diagnostic controller, that a mechanical abnormality has occurred when the analyzed high frequency exceeds a first threshold value of a Modulation Frequency index, or when the analyzed high frequency exceeds a second or third threshold value of a Kurtosis index,
    wherein an engine noise analysis control by the diagnosis controller for determining the occurrence of the mechanical abnormality is performed by a Kurtosis analysis control which determines a cylinder having the mechanical abnormality by respectively applying the second and third threshold values to the Kurtosis index calculated from a magnitude standardization of a noise level for noise data and a specific frequency band, a modulation frequency analysis control of calculating the Modulation Frequency index by performing a Down sampling and a Transform a plurality of times on the noise data, and an excitation influence determination control of determining the cylinder having the mechanical abnormality by applying the first threshold value to the Modulation Frequency Index.

2. The mechanical diagnosis method of claim 1,
    wherein:
    the measured abnormal noise comprises a signal component by rotation excitation,
    the Kurtosis calculates, as the Kurtosis index, an Energy K and a Loudness standard deviation index to which the second threshold value and the third threshold value are respectively applied, and
    the Modulation Frequency Transform calculates a plurality of order component values for an order frequency peak to which the first threshold value is applied as the Modulation Frequency Index.

3. The mechanical diagnosis method of claim 2,
    wherein the plurality of order component values are an $0.5_{th}$ component value, a primary component value, and a secondary component value of the order frequency peak.

4. The mechanical diagnosis method of claim 1,
    wherein the Kurtosis analysis control is performed by:
    performing the magnitude standardization for the noise level of the noise data, selecting the specific frequency band by a Band Pass Filter processing, calculating an Energy K and a Loudness standard deviation index as the Kurtosis index by the Kurtosis analysis, and determining the cylinder having the mechanical abnormality by confirming combustion abnormality based on the second threshold value and the third threshold value being respectively compared to the Energy K and the Loudness standard deviation index.

5. The mechanical diagnosis method of claim 4, wherein the magnitude standardization is 90 dB, and the specific frequency band is 0.5 to 4 kHz.

6. The mechanical diagnosis method of claim 4, wherein the second threshold value for the Energy K is 3.8, and the third threshold value for the Loudness standard deviation index is 0.13.

7. The mechanical diagnosis method of claim 1, wherein the modulation frequency analysis control is performed by: performing a plurality of times of Down samplings on the noise data, performing a Hilbert transform followed by an Envelope transform between the plurality of times of Down samplings, performing a Low Pass Filter processing between the plurality of times of Down samplings, performing a Fast Fourier Transform (FFT) transform after the plurality of times of Down samplings, and analyzing a plurality of order component values for an order frequency peak.

8. The mechanical diagnosis method of claim 7, wherein the plurality of times of Down samplings are classified into a primary Down sampling performed for the noise data, a secondary Down sampling performed for Envelope-transformed data, and a tertiary Down sampling performed for Low Pass Filter-processed data.

9. The mechanical diagnosis method of claim 8, wherein the primary Down sampling is to perform resampling an interesting frequency region at a twice level.

10. The mechanical diagnosis method of claim 8, wherein the secondary Down sampling is to perform resampling at a ½ level of the primary Down sampling.

11. The mechanical diagnosis method of claim 8, wherein the tertiary Down sampling is to perform resampling at a twice level relative to a reference frequency of the FFT.

12. The mechanical diagnosis method of claim 1, wherein the excitation influence determination control is performed by: classifying a plurality of order component values into an $0.5^{th}$ component value, a primary component value, and a secondary component value from an order frequency peak, determining a magnitude by applying the first threshold value to the $0.5^{th}$ component value, the primary component value, and the secondary component value, and determining the cylinder having the combustion abnormality or a normal cylinder based on the determined magnitude.

13. The mechanical diagnosis method of claim 12, wherein the determined magnitude is confirmed by applying the first threshold value to each of the $0.5^{th}$ component value, the primary component value, and the secondary component value, and the combustion abnormality is determined when each of the $0.5^{th}$ component value, the primary component value, and the secondary component value is greater than the first threshold value.

14. The mechanical diagnosis method of claim 13, wherein each of the $0.5^{th}$ component value, the primary component value, and the secondary component value is compared with the first threshold value.

15. The mechanical diagnosis method of claim 14, wherein the first threshold value is 0.075.

16. A combustion abnormality diagnosis determination system, comprising:
 a diagnosis controller configured to:
  calculate an Energy K and a Loudness standard deviation index for noise data measured together with a signal component by rotation excitation of an engine with Kurtosis analysis,
  calculate an $0.5_{th}$ component value, a primary component value, and a secondary component value of an order frequency peak by a Modulation Frequency Transform, and
  distinguish a cylinder where abnormal combustion occurs from a cylinder where normal combustion occurs by respectively applying a first threshold value, a second threshold value and a third threshold value to the Energy K, the Loudness standard deviation index, and each of the $0.5_{th}$ component value, the primary component value, and the secondary component value of the order frequency peak; and
 a noise sensor configured to measure the noise data during an operation of the engine,
 wherein;
  the Energy K applies 3.8 as the first threshold value,
  the Loudness standard deviation index applies 0.13 as the second threshold value, and
  each of the $0.5_{th}$ component value of the order frequency peak, the primary component value of the order frequency peak, and the secondary component value of the order frequency peak identically applies 0.075 as the third threshold value.

17. The combustion abnormality diagnosis determination system of claim 16, wherein the noise sensor is a microphone mounted to an oil fan of the engine to measure the noise data.

* * * * *